June 19, 1951 F. C. VICTORY 2,557,849
VARIABLE SPEED DRIVE
Filed July 20, 1948 4 Sheets-Sheet 3

INVENTOR.
FREDERICK C. VICTORY
BY
John J Hanrahan
ATTORNEY.

June 19, 1951  F. C. VICTORY  2,557,849
VARIABLE SPEED DRIVE

Filed July 20, 1948  4 Sheets-Sheet 4

INVENTOR.
FREDERICK C. VICTORY
BY
John H Hanrahan
ATTORNEY

Patented June 19, 1951

2,557,849

UNITED STATES PATENT OFFICE 2,557,849

VARIABLE-SPEED DRIVE

Frederick C. Victory, Milford, Conn., assignor to Moore Special Tool Co., Inc., a corporation of Connecticut Application July 20, 1948, Serial No. 39,712

11 Claims. (Cl. 74—230.17)

This invention relates to new and useful improvements in variable speed drives and has particular relation to a variable speed pulley drive.

An object of the invention is to provide a variable speed pulley drive including an expansible spring loaded driving pulley, an expansible spring loaded driven pulley, a speed change mechanism or device comprising a pair of intermediate expansible driving and driven pulleys belted respectively to the spring loaded driving and driven pulleys and including means coupling a flange of one intermediate pulley with a flange of the other thereof, and power means including a reversible electric motor operable to simultaneously shift the coupled flanges of the intermediate pulleys to change the effective diameters of such pulleys to vary the rate of drive from the spring loaded drive through such intermediate to the spring loaded driven pulley and wherein the spring loading of the driving and driven pulleys provides for automatic adjustment of the effective diameters of the latter as the coupled flanges of the intermediate pulleys are adjusted by said power means and further providing automatically to compensate for the change in the length of the belt path resulting from changes in the effective diameters of such intermediate pulleys.

Another object is to provide in a variable speed pulley drive including a driving and a driven pulley and intermediate pulleys coupled respectively to such driving and driven pulleys an improved frame or mounting structure and an improved arrangement of parts whereby the belts may be easily applied to the pulleys as in new installations or when replacing damaged or worn belts or the like.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

Figure 1:
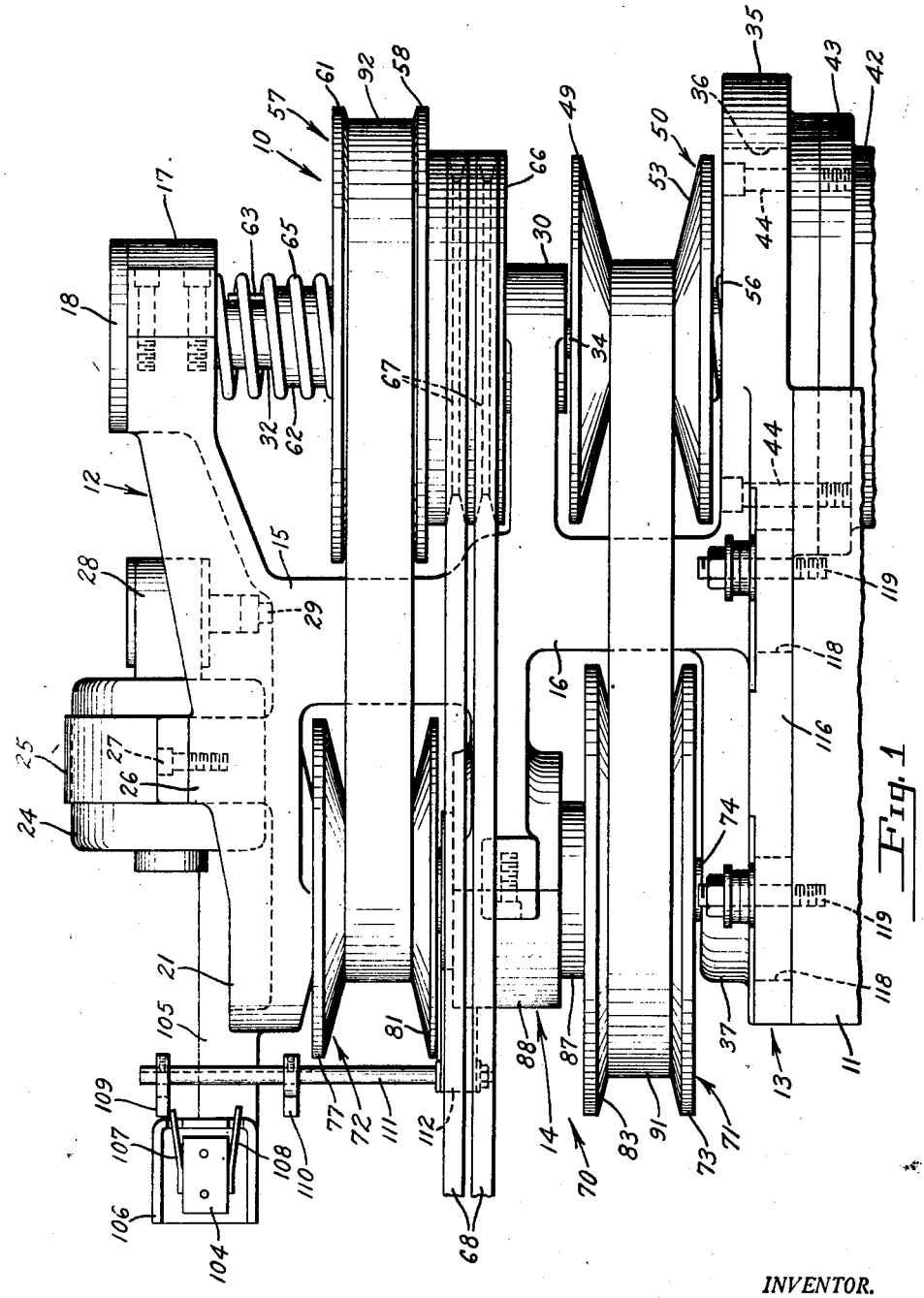
Fig. 1 is a side elevational view showing a variable speed pulley drive constructed in accordance with the invention.
Figure 2:
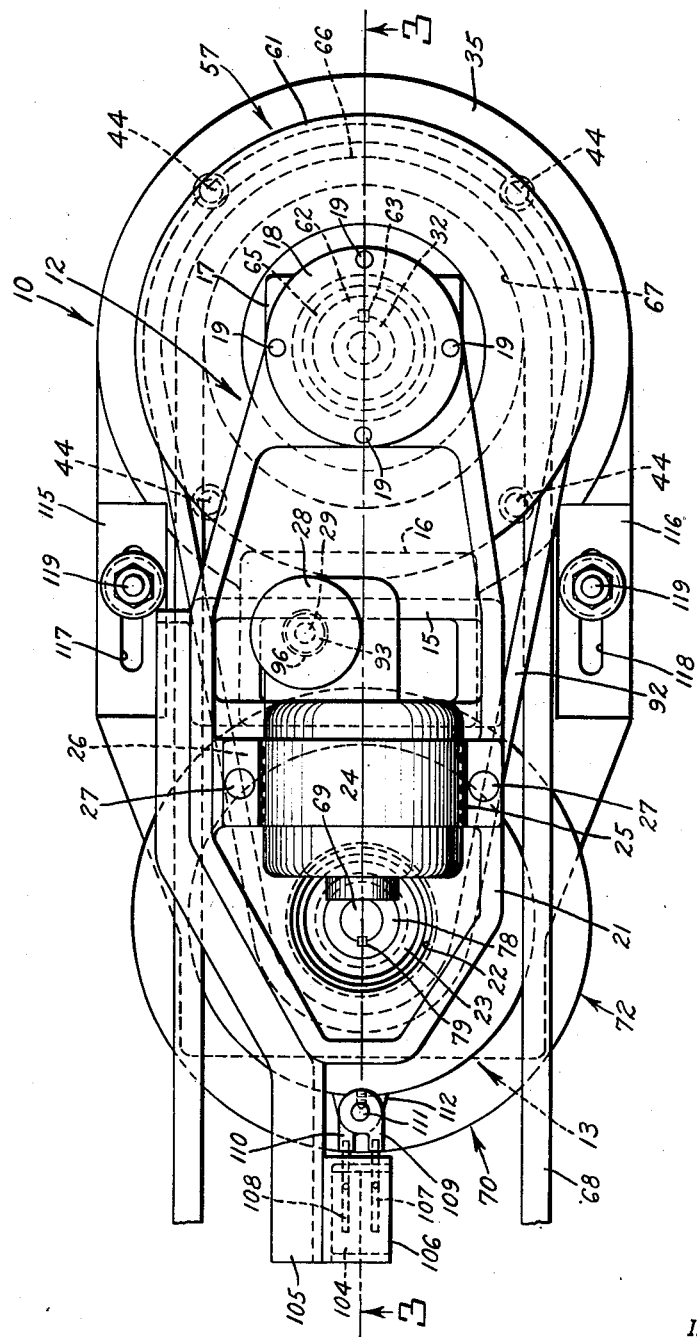
Fig. 2 is a top plan view of the same.
Figure 3:
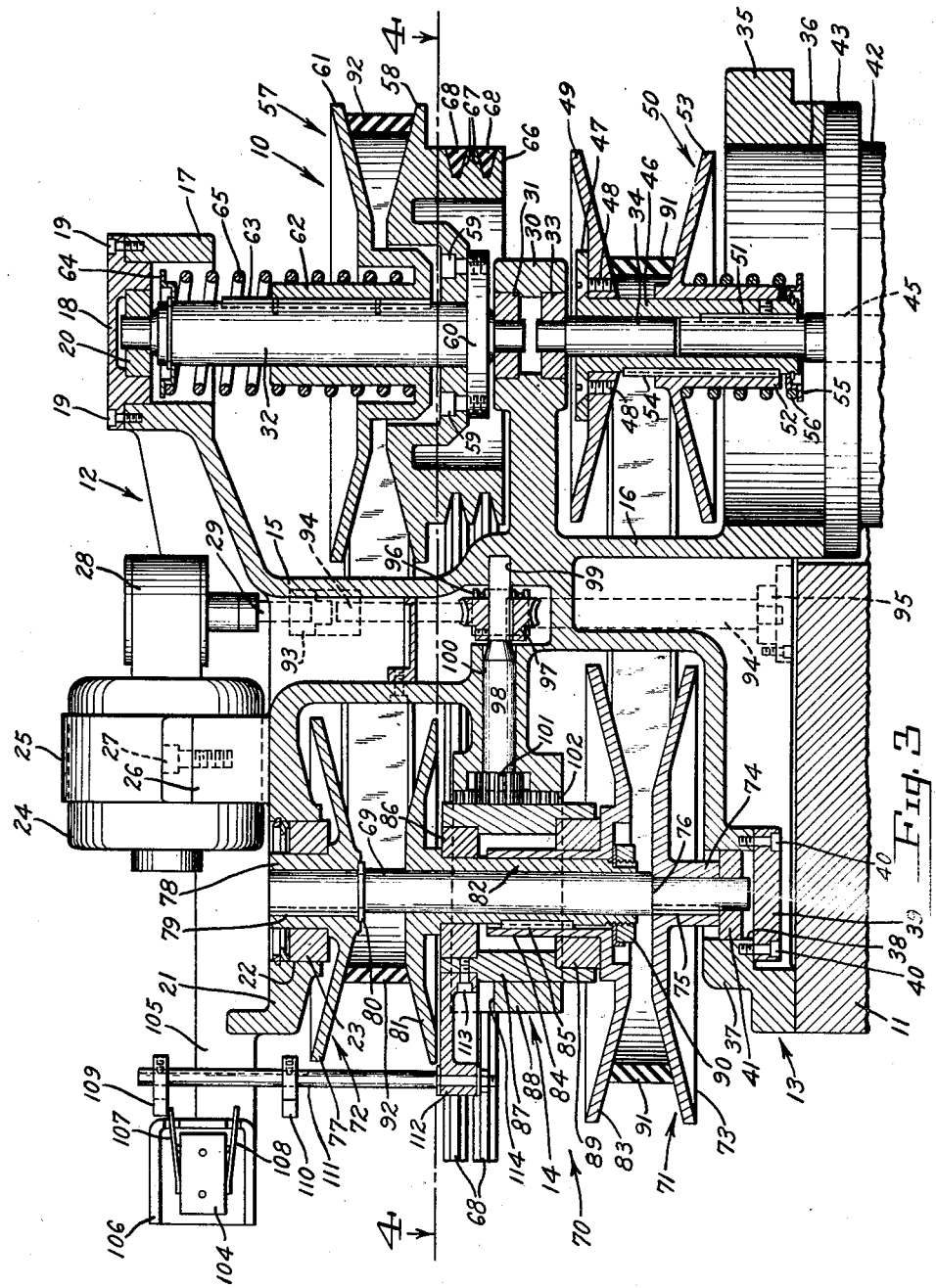
Fig. 3 is a vertical longitudinal sectional view taken as along the plane of the line 3—3 of Fig. 2.
Figure 4:
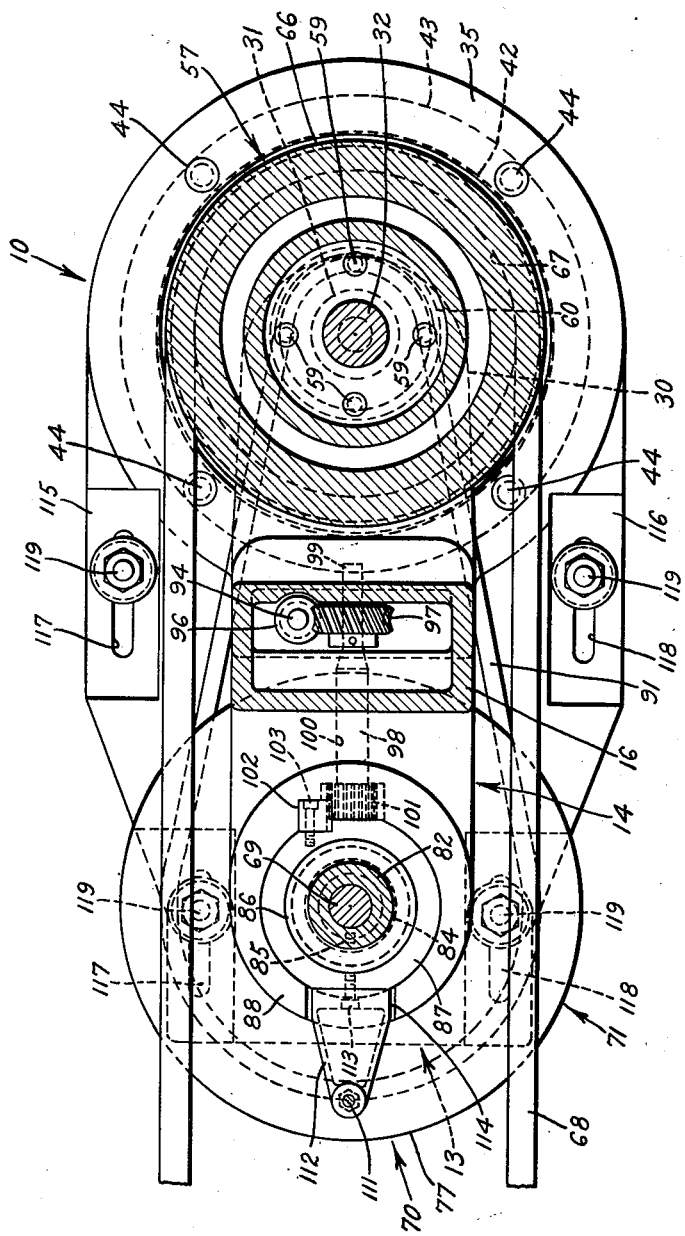
Fig. 4 is a horizontal longitudinal sectional view taken as along the plane of the line 4—4 of Fig. 3.

Referring in detail to the drawings, my improved variable speed pulley drive is generally designated 10 and the same is shown as mounted on a part 11 of the frame or like portion of any machine to which the drive is applied, or of any other suitable support. Drive 10 comprises a unit, all parts of which are mounted on a frame or casting, including outer arms 12 and 13 and an intermediate arm 14, such three arms being rigidly connected in their intermediate portions. Thus, in the drawings, a frame portion 15 connects the mid or intermediate portions of the arms 12 and 14 while a frame portion 16 connects the mid or intermediate portions of the arms 13 and 14.

All of the arms are free of one another in their outer end portions or except for their intermediate or mid portions where they are connected by the frame pieces 15 and 16. At one end, arm 12 includes a short cylindrical portion or part 17 mounting a bearing cap 18 secured in place as by screws 19. Cap 18 mounts any desired type of bearing 20. Beyond the frame portion or part 15, arm 12 includes a relatively large portion 21 centrally provided with an opening 22 mounting on a bearing device 23.

The inner part of said portion 21 has a reversible electric motor 24 secured thereto as by a clamp or strip 25 secured to a frame portion 26 as with bolts 27. The purpose of this motor will later be fully set forth but here it is noted that the motor, through a suitable gearing (not shown) in a gear casing 28, drives a shaft 29 shown as extending generally at right angles to the frame arms 12, 13 and 14.

An end portion 30 of the intermediate arm 14 is also somewhat ring-like or in the form of a short cylinder and supports a suitable bearing 31 in alignment with the bearing 20 in the cap 18. These bearings 20 and 31 mount the respective ends of a driven shaft 32, later to again be considered. Also, in the arm portion 30 and in alignment with the bearing 31 is a second bearing 33 mounting one end of a relatively short or stub shaft 34, which in the present instance, serves for the mounting of a drive pulley, all as will be fully set forth.

The end portion 35 of the arm 13 is also hollow or cylindrical being provided with a relatively large diameter cylindrical opening or passageway 36 generally concentric with the stub shaft 34. The opposite end portion 37 of the arm 13 has an opening 38 therethrough closed at its outer side as by a cap 39 secured in place by screws or bolts 40. Also, the opening 38 provides for the mounting of a bearing 41 concentric with the bearing 23 in the portion 21 of arm 12.

A source of power, in the present instance comprising an electric motor 42, is mounted on the above described frame as by having its flange 43 located against the underside of the cylindrical arm portion 35 of the frame and then being bolted to the frame as by bolts 44 passing through said frame part and into the motor flange. The motor 42 is mounted with its shaft 45 concentric with or aligned with the stub shaft 34 above mentioned.

On this stub shaft 34 is a sleeve 46 at its inner end having an annular flange 47 to which screws 48 secure a cone flange 49 of a driving pulley generally designated 50. The sleeve 46 extends outwardly of the end of the stub shaft 34 and receives the end portion of the motor shaft 45 and is connected in driving relation with the latter as through a key 51. Mounted on the sleeve 46 is a sleeve or hub-like portion 52 comprising an integral part of a second cone flange 53 of said driving pulley 50. The sleeve 52 is slidable longitudinally on the sleeve 46 to carry the pulley flange 53 toward and from the pulley flange 49. However, such sleeve 52 is fixed to turn with the sleeve 46, these parts being connected as by a key 54 extending parallel with the aligned shafts 34 and 45 and with the key 51.

The pulley 50 is spring loaded or includes spring means whereby its movable flange 53 is constantly urged toward its fixed flange 49. To the desired end, a stop or limiting flange 55 is fixed to the free end portion of the sleeve 46 beyond the outer limit of the key 54 and a relatively heavy coil spring 56 bears at its respective ends against the stop 55 and the inner circumferential portion of the pulley flange 53.

The spring lies about the sleeve 52 of said pulley flange and is constantly tending to move the latter toward the pulley flange 49. However, against the resistance of said spring and by compression of said spring, the pulley flange 53 may be moved away from the pulley flange 49. As the pulley flanges 49 and 53 are tapered on their inner or opposed surfaces, it will be understood that as said flanges are moved toward one another or away from one another, a belt running on the pulley will be remote from or nearer to the axial center of the pulley and thus will be effective on a larger or smaller diameter portion of the pulley. Thus, the pulley 50 is herein described as an expansible variable speed pulley.

Mounted on the driven shaft 32 is an expansible variable speed pulley generally designated 57. Pulley 57 includes a fixed cone flange 58 secured as by means of screws 59 to a collar or ring 60 on the shaft 32 and in addition includes a cone flange 61 integral or rigid with a sleeve 62 slidable longitudinally of the shaft 32 but adapted for turning movement therewith by reason of a key 63 keying the shaft and sleeve 62 together. Pulley 57 is also a spring loaded expansible variable speed pulley.

A stop or flange 64 is fixed to the outer end of the shaft 32 and a rather heavy coil spring 65 bears at one end against said flange or stop and at its other end against the flange 61 of the pulley 57. Thus, the coil spring 65 is constantly tending to move the cone flange 61 toward the cone flange 58 and since each of said flanges is a cone on its inner face, or since the flanges are coned on their opposing faces, it will be seen that as the flange 61 moves toward flange 58, the effective diameter of the pulley 57 is increased and as the flange 61 moves away from the flange 58, the effective diameter of the pulley 57 is decreased.

The spring 65 functions in substantially the same manner as the spring 56. That is, spring 65 constantly tends to move the flange 61 towards the flange 58 but the former may be moved away from the latter on compression of said spring 65. Integral or otherwise made rigid with the pulley flange 58 is a power take-off pulley 66 shown as provided with a pair of V-grooves 67. These grooves receive V-belts 68 trained over the take-off pulley 66 and also over pulleys (not shown) on a spindle or other part (not shown) to be driven.

Mounted in the bearing device 23 and 41 are the respective end portions of a countershaft 69. Such countershaft comprises a portion of a change speed device or mechanism, generally designated 70 and including change speed driving and driven pulleys generally designated 71 and 72, respectively. Pulley 71 includes a stationary cone flange 73 having a hub 74 secured as by a key 75 to an end portion of the shaft 69. This hub is located between the bearing device 41 and a shoulder 76 on the shaft 69. Somewhat similarly, the pulley 72 includes a fixed cone flange 77 including a hub 78 keyed to the other end portion of the shaft 69 as by a key 79 and located in the bearing 23. A collar or the like 80 on the shaft, together with the bearing means 23, locates the pulley flange 77.

In addition, pulley 72 includes a second cone flange 81 arranged with its cone face in opposed relation to that of the flange 77. This flange 81 is integral or otherwise rigid with a sleeve 82 extending along or receiving the mid portion of the shaft 69. A second cone flange 83 of the pulley 71 has its cone face in opposing relation with the cone face of the flange 73 and includes a sleeve 84 telescoping over the sleeve 82 and through which the latter sleeve extends.

These sleeves are secured together to rotate as a unit, the securing means being shown as a key 85. The inner portion of the sleeve 82 is received in a bearing 86 in one end portion of a coupling 87 slidable through a ring-like portion 88 comprising the outer end of the mid or intermediate arm 14 of the main frame. In its other end portion, the coupling 87 receives a bearing 89 mounting the sleeve 84 of the pulley flange 83. A nut 90 is threaded on the free end portion of the sleeve 82 and thus ties together as a unit the pulley flanges 81 and 83, the sleeves 82 and 84, the bearings 86 and 89, and the coupling sleeve 87. All of these parts are slidable longitudinally of the shaft 69 and through the ring-like cylindrical or bearing portion 88 of the arm 14.

For the purpose of varying the effective speed of the present drive, the coupling 87 is shifted longitudinally of the shaft 69 to carry one of the pulley flanges 81 and 83 toward or from its complemental flange or the companion flange of its pulley. That is, as the coupling 87 is shifted to carry the flange 81 toward the flange 77 of the pulley 72, flange 83 will be carried from the flange 73 of the pulley 71. This will increase the effective diameter of the pulley 72 and decrease the effective diameter of the pulley 71. Obviously, on the coupling 87 being shifted in the opposite direction there will be a reversal of the adjustment so that the effective diameter of the pulley 72 will be decreased and the effective diameter of the pulley 71 will be increased.

A suitable V-belt 91 is trained over the driving pulley 50 of my change speed transmission 10 and over the driving pulley 71 of the intermediate or change speed mechanism 70 of such variable speed transmission. A similar V-belt 92 is trained over the driven pulley 57 of my variable speed transmission 10 and the driven pulley 72 of the speed change mechanism 70 of said transmission. With this construction, it will be understood that assuming the motor shaft 45 to be driven at a fixed speed, the speed at which the power take-off pulley 66 is driven may be varied almost infinitely.

The drive may be approximately one-to-one as between the belts 91 and 92 or it may be the pulley 66 will be driven many times as fast as the pulley 50. The variations in speed may be extremely slight since adjustments are not made in any actual steps. Thus, if the coupling 87 is shifted to lessen the effective diameter of the pulley 71 of the change speed mechanism 70, the belt 91 will be permitted to draw inwardly toward the center of said pulley 71.

As this takes place, the spring 55 working against the flange 53 of the pulley 50 will shift said flange toward the flange 49 of that pulley to increase the effective diameter of the latter. In this connection it is noted that the springs 55 and 65 will shift the spring loaded flanges of either of the pulleys 50 and 57 to automatically compensate for any change in the lengths of the belt paths resulting from changes in the effective diameters of the pulleys 71 and 72 of the change speed mechanism 70. Thus, the springs will cause the pulleys 50 and 57 to always maintain the belts 91 and 92 at the proper tension.

As the pulley flange 83 is shifted to lessen the effective diameter of the pulley 71, the pulley flange 81 is necessarily shifted toward the pulley flange 77 of the pulley 72 to increase the effective diameter of that pulley. This will result in a crowding outwardly toward the outer periphery of the pulley 72 of the belt portion trained about said pulley with a resultant inward drawing of the portion of said belt trained about the driven pulley 57. The first noted change is forced by mechanical shifting of the pulley flange 81 while the spring 65 permits of the latter change or the shifting of the pulley flange 61 to automatically compensate.

Power means are provided for shifting the coupling 87 to adjust the expansible pulleys 71 and 72 of the change speed mechanism 70 and such power means includes the reversible motor 24 and the shaft 29 previously mentioned. Shaft 29, through a suitable coupling 93, is secured to the upper end of a shaft 94 which at its lower end may be mounted in a footstep bearing 95. The shaft 94 carries a worm 96 meshing with a worm gear 97 on a shaft 98. Shaft 98 is arranged at right angles to the shaft 69 and is shown as having bearing in the frame parts at 99 and 100.

Fixed to one end of shaft 98 is a pinion or gear 101 constantly meshing with a rack 102 fixed to the coupling 87 as by means of a screw 103. Since the motor 24 is a reversible electric motor, it will be understood that when it is energized to run in one direction it will, through the described shafts and gearing, turn the pinion 101 in a direction to feed the rack 102 and thus the coupling 87 in one direction and when energized to turn in a reverse direction through the same mechanism, the coupling 87 will be shifted in the opposite direction.

The effect of the movement of this coupling on the pulleys 71 and 72 of the change speed mechanism 70 has been fully set forth. When the motor is energized, it will run in one direction until stopped and thus the operator by witnessing the effect on a spindle or other part being driven by the belt 68, will know when to discontinue energizing of the motor 24. If desired, a tachometer (not shown) may be employed.

To prevent any excessive movement of the parts, such as would result in jamming or breaking of the parts, a limiting switch 104 is provided. This switch is shown as mounted on an extension 105 of the frame arm 12 and as located within an open sided housing 106. Operating arms 107 and 108 of the switch extend through an inner wall of the housing and are located in the path of movement of operating lugs 109 and 110 fixed in any desired manner to an upright or rod 111 in turn fixed to a bracket 112 bolted or otherwise secured to the coupling 87. In the drawings I have shown bolts or screws 113 as the means employed for fastening bracket 112 to such coupling and to accommodate the coupling, the cylindrical bearing portion 88 of the arm 14 is provided with a cutout or opening 114.

With this construction, when the motor 24 is energized to feed the coupling 87 toward the expansible pulley 71 of the change speed mechanism 70 at the extreme limit of any such possible movement the stop lug 109 will engage the switch arm 107 to open the circuit to the motor 24. On excessive movement of the coupling in the opposite direction by the motor, the stop lug 110 will engage the switch arm 108 to open the motor circuit. Thus, the switch 104 and its attendant mechanism is in the form of a safety device.

It is noted that the arms 12, 13 and 14 are connected only on their mid or intermediate portions and that their end portions are free of one another. With this construction, it will be seen that the belt 91 may be mounted on the pulleys 50 and 71 by dropping the belt over the frame and working one portion of it at a time over the frame portions and the pulleys 57 and 72. Similarly, the V-belts 68 may easily be placed about the takeoff pulley 66 by dropping said V-belts down over the present drive assembly. In the same manner, the belt 92 is easily trained about or placed over the pulleys 57 and 72 or replaced when a new belt is desired.

Shifting of the pulleys in the frame to permit of the mounting of the belts is not necessary. The frame or casting of the present variable speed pulley drive is, in its lower side portions 115 and 116, provided with slots 117 and 118, respectively, through which mounting bolts 119 pass. These bolts may be used for securing the present drive 10 to the support or machine part 11. Also, on loosening of these bolts, the present drive may be shifted in the direction of the lengths of the slots 117 and 118 to compensate for stretching of the V-belts 68 or to permit of ease in mounting such belts or training such belts about the take-off pulley 66.

Having thus set forth the nature of my invention, what I claim is:

1. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, said means including a tubular coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys, respectively, and said arms free at their outer ends and supported from their mid portions whereby belts may be slipped over said frame including said arms and onto the respective sets of pulleys.

2. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, said means including a coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys, respectively, said arms free at their outer ends and supported from their mid portions whereby belts may be slipped over said frame including said arms and onto the respective sets of pulleys, and said means for rotating said gear comprising a reversible electric motor selectively operable in either direction to move the inner flanges of said change speed pulleys toward and from their companion flanges.

3. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portions of said intermediate arm, said means including a coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys respectively, said arms free at their outer ends and supported from their mid portions whereby belts may be slipped over said frame including said arms and onto the respective sets of pulleys, and said driving and driven pulleys each including a fixed flange and a spring loaded flange movable toward and from its fixed flange for automatic adjustment of such driving and driven pulleys in accordance with adjustment of said change speed pulleys and to automatically compensate for changes in the lengths of the belt paths resulting from changes in the effective diameters of the change speed pulleys.

4. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, a rack fixed to said coupling means and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys respectively, said arms free at their outer ends and supported from their mid portions whereby belts may be slipped over said frame including said arms and onto the respective sets of pulleys, said means for rotating said gear comprising a reversible electric motor selectively operable in either direction to move the selected inner flange of said change speed pulleys toward its companion flange, and said driving and driven pulleys each including a fixed flange and a spring loaded flange movable toward and from its fixed flange for automatic adjustment of such driving and driven pulleys in accordance with adjustment of said change speed pulleys and to automatically compensate for changes in the lengths of the belt paths resulting from changes in the effective diameters of the change speed pulleys.

5. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, a rack fixed to said coupling means and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys respectively, said arms free at their outer ends and supported from their mid portions whereby belts may be slipped over said frame including said arms and onto the respective sets of pulleys, said driving and driven pulleys each including a fixed flange and a spring loaded flange movable toward and from its fixed flange for automatic adjustment of such driving and driven pulleys in accordance with adjustment of said change speed pulleys and to automatically compensate for changes in the lengths of the belt paths resulting from changes in the effective diameters of the change speed pulleys, and a power take-off pulley rigid with the fixed flange of said driven pulley.

6. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, said means including a tubular coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys, respectively, said arms free at their outer ends and supported from their mid portions whereby belts may be slipped over said frame including said arms and onto the respective sets of pulleys, and a take-off pulley rigid with the fixed flange of said driven pulley.

7. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft passing through the other end portion of said intermediate arm and having bearing in the aligned end portions of said outer arms, a driving pulley on said drive shaft, a driven pulley on said driven shaft, expansible pulleys on said countershaft at the respective sides of said end portion of said intermediate arm, each of said expansible pulleys comprising an outer fixed flange and an inner movable flange, means coupling said movable flanges together through said end portion of said intermediate arm, said means including a coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys respectively, said arms free at their outer ends and supported from their mid portions whereby belts may be slipped over said frame including said arms and onto the respective sets of pulleys, said means for rotating said gear comprising a reversible electric motor selectively operable in either direction to move the inner flanges of said change speed pulleys toward and from their companion flanges, a limit switch controlling said motor, and means movable with said coupling and located to operate said switch at the limit of predetermined movement of said coupling and thus of said inner pulley flanges in either direction.

8. In a variable speed pulley drive, a rigid frame, aligned driving and driven shafts supported in said frame for rotation relative thereto, expansible driving and driven pulleys on the respective shafts, a countershaft mounted for rotation in said frame in parallel spaced relation to said driving and driven shafts, intermediate expansible driving and driven pulleys on said countershaft and substantially aligned with the first mentioned driving and driven pulleys, belts connecting the first mentioned driving and driven pulleys with the second mentioned driving and driven pulleys respectively, means coupling together the adjacent flanges of said intermediate pulleys, a rack fixed to said coupling, a gear meshing with said rack, a reversible electric motor, means mounting said motor on said frame with the shaft of said motor normal to said shaft, an adjusting shaft mounted in said frame and located intermediate and substantially parallel with said driving and driven shafts and said counter shaft, a gear drive between said motor and the outer end of said adjusting shaft, a shaft connected to the first mentioned gear and mounted in said frame and located substantially parallel with the shaft of said motor, a second gear drive between said adjusting shaft and the last mentioned shaft whereby said motor may drive said rack for shifting said coupling, and thus said adjacent flanges of said intermediate pulleys relative to the other flanges thereof to vary the rate of drive from the first mentioned driving pulley to the first mentioned driven pulley through said intermediate pulleys, and said first mentioned driving and driven pulleys each including a spring loaded flange movable relative to its other flange against the opposition of its spring and under the influence of its spring depending on the direction of adjustment of the adjacent flanges of the intermediate pulleys whereby said first mentioned driving and driven pulleys are automatically adjusted in accordance with adjustments of the intermediate pulleys and further automatically compensate for change in the lengths of the belt paths resulting from changes in the effective diameters of such intermediate pulleys.

9. In a variable speed pulley drive, a rigid frame, aligned driving and driven shafts supported in said frame for rotation relative thereto, expansible driving and driven pulleys on the respective shafts, a countershaft mounted for rotation in said frame in parallel spaced relation to said driving and driven shafts, intermediate expansible driving and driven pulleys on said countershaft and substantially aligned with the first mentioned driving and driven pulleys, belts connecting the first mentioned driving and driven pulleys with the second mentioned driving and driven pulleys respectively, means coupling together the adjacent flanges of said intermediate pulleys, a rack fixed to said coupling, a gear meshing with said rack, a reversible electric motor, means mounting said motor on said frame with the shaft of said motor normal to said shafts, an adjusting shaft mounted in said frame and located intermediate and substantially parallel with said driving and driven shafts and said counter shaft, a gear drive between said motor and the outer end of said adjusting shaft, a shaft connected to the first mentioned gear and mounted in said frame and located substantially parallel with the shaft of said motor, a second gear drive between said adjusting shaft and the last mentioned shaft whereby said motor may drive said rack for shifting said coupling and thus said adjacent flanges of said intermediate pulleys relative to the other flanges thereof to vary the rate of drive from the first mentioned driving pulley to the first mentioned driven pulley through said intermediate pulleys.

10. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft having bearing in the aligned other end portions of said outer arms, a driving pulley on said drive shaft, a driven pulley on said driven shaft, expansible pulleys on said countershaft, each of said expansible pulleys comprising an outer fixed flange and an inner movable flange, means coupling said movable flanges together, said means including a tubular coupling, a rack fixed to said coupling and extending parallel with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys, respectively, and said arms free at their outer ends and supported from their mid portions whereby belts may be slipped over said frame including said arms and onto the respective sets of pulleys.

11. In a variable speed pulley drive, in combination, a frame including three substantially aligned arms, a drive shaft supported from one end portion of the intermediate of said arms, a driven shaft supported in alignment with said drive shaft and by and between said end portion of the intermediate arm and an end portion of an outer arm, a countershaft having bearing in the aligned other end portions of said outer arms, a driving pulley on said drive shaft, a driven pulley on said driven shaft, expansible pulleys on said countershaft, each of said expansible pulleys comprising an outer fixed flange and an inner movable flange, means coupling said movable flanges together, said means including a coupling, a rack fixed to said coupling and extending paralled with said countershaft, a gear meshing with said rack, means for turning said gear in the selected direction to move said inner flanges to carry one toward and the other from the outer flange of its pulley whereby to vary the effective diameters of said intermediate pulleys, belts connecting the intermediate pulleys with the driving and driven pulleys respectively, said arms free at their outer ends and supported from their mid portions whereby belts may be slipped over said frame including said arms and onto the respective sets of pulleys, and said driving and driven pulleys each including a fixed flange and a spring loaded flange movable toward and from its fixed flange for automatic adjustment of such driving and driven pulleys in accordance with adjustment of said change speed pulleys and to automatically compensate for changes in the lengths of the belt paths resulting from changes in the effective diameters of the change speed pulleys.

FREDERICK C. VICTORY.

REFERENCES CITED

The following references are of record in the file of this patent:

UNITED STATES PATENTS

| Number | Name | Date |
|---|---|---|
| 2,179,053 | Reeves | Nov. 7, 1939 |
| 2,212,194 | Lewellen | Aug. 20, 1940 |
| 2,251,488 | Hucke | Aug. 5, 1941 |
| 2,326,508 | Whitcomb | Aug. 10, 1943 |
| 2,348,940 | Voegeli | May 16, 1944 |
| 2,464,841 | Alexander | Mar. 22, 1949 |
| 2,522,353 | Eserkaln | Sept. 12, 1950 |

FOREIGN PATENTS

| Number | Country | Date |
|---|---|---|
| 464,331 | Great Britain | Apr. 12, 1937 |
| 372,509 | Italy | June 30, 1939 |